(12) United States Patent
Perdue

(10) Patent No.: US 10,167,206 B2
(45) Date of Patent: Jan. 1, 2019

(54) METHOD AND APPARATUS FOR RECHARGING A DEIONIZATION VESSEL

(71) Applicant: Ecolab USA Inc., St. Paul, MN (US)

(72) Inventor: Raymond H. Perdue, Orland Park, IL (US)

(73) Assignee: Ecolab USA Inc., St. Paul, MN (US)

( * ) Notice: Subject to any disclaimer, the term of this patent is extended or adjusted under 35 U.S.C. 154(b) by 340 days.

(21) Appl. No.: 15/215,841

(22) Filed: Jul. 21, 2016

(65) Prior Publication Data

US 2017/0022074 A1 Jan. 26, 2017

Related U.S. Application Data

(60) Provisional application No. 62/196,122, filed on Jul. 23, 2015.

(51) Int. Cl.
| | | |
|---|---|---|
| *C02F 1/42* | (2006.01) | |
| *B01J 47/012* | (2017.01) | |
| *B01J 47/04* | (2006.01) | |
| *B01J 49/09* | (2017.01) | |
| *B01J 49/85* | (2017.01) | |
| *C02F 103/04* | (2006.01) | |

(52) U.S. Cl.
CPC ............ *C02F 1/42* (2013.01); *B01J 47/012* (2017.01); *B01J 47/04* (2013.01); *B01J 49/09* (2017.01); *B01J 49/85* (2017.01); *C02F 2001/427* (2013.01); *C02F 2103/04* (2013.01); *C02F 2303/14* (2013.01); *C02F 2303/16* (2013.01)

(58) Field of Classification Search
CPC .... C02F 1/42; C02F 2001/42; C02F 2103/04; C02F 2303/14; C02F 2303/16; B01J 47/012; B01J 47/04; B01J 49/09; B01J 49/85
See application file for complete search history.

(56) References Cited

U.S. PATENT DOCUMENTS

| | | |
|---|---|---|
| 2,560,960 A | 7/1951 | Klumb |
| 3,402,126 A | 9/1968 | Cioffi |
| 3,842,870 A | 10/1974 | Burgess |

(Continued)

FOREIGN PATENT DOCUMENTS

| | | |
|---|---|---|
| CN | 2282928 Y | 6/1998 |
| DE | 202009001946 U1 | 7/2010 |

(Continued)

OTHER PUBLICATIONS

Israel Patent Office, International Search Report in International Patent Application No. PCT/US2016/043232, dated Oct. 27, 2015, 4 pp.

(Continued)

*Primary Examiner* — Matthew O Savage
(74) *Attorney, Agent, or Firm* — Leydig, Voit & Mayer, Ltd.

(57) ABSTRACT

Deionization equipment and methods of using such deionization equipment are provided. The deionization equipment allows for improved efficiency in removing spent deionization resin from deionization apparatuses, and also recharging functional deionization resin into deionization apparatuses. Embodiments of the deionization equipment include a resin transfer passage that includes an upper opening, a lower opening and an intermediate opening.

20 Claims, 5 Drawing Sheets

(56) References Cited

U.S. PATENT DOCUMENTS

| | | | |
|---|---|---|---|
| 4,329,225 | A | 5/1982 | Davis et al. |
| 5,464,532 | A | 11/1995 | Nowlin et al. |
| 6,843,920 | B1 | 1/2005 | Darmawan |
| 7,635,427 | B2 | 12/2009 | Suzuki et al. |
| 7,722,772 | B2 | 5/2010 | Furukawa et al. |
| 2003/0116492 | A1 | 6/2003 | Fullmer et al. |
| 2006/0037900 | A1 | 2/2006 | Sebastian |
| 2009/0114583 | A1 | 5/2009 | Yoneda et al. |
| 2013/0146087 | A1 | 6/2013 | Everson et al. |
| 2015/0171440 | A1 | 6/2015 | Kamo et al. |
| 2017/0050865 | A1* | 2/2017 | Denton .................. C02F 1/42 |

FOREIGN PATENT DOCUMENTS

| | | |
|---|---|---|
| GB | 2301542 B | 12/1996 |
| JP | 5391965 B2 | 1/2014 |

OTHER PUBLICATIONS

Israel Patent Office, Written Opinion in International Patent Application No. PCT/US2016/043232, dated Oct. 27, 2015, 4 pp.

Duff Co., "Control Valves & Parts," http:/www.duffcompany.com/departments/water-treatment/control-valves-parts/, accessed Jul. 8, 2016, 6 pp.

\* cited by examiner

METHOD AND APPARATUS FOR RECHARGING A DEIONIZATION VESSEL

This application is a nonprovisional application claiming the benefit of U.S. Provisional Patent Application No. 62/196,122, filed Jul. 23, 2015, the contents of which are incorporated by reference herein in its entirety.

BACKGROUND

Several processes require water of high purity. Examples of such processes include semiconductor production and pharmaceutical production. Deionization is a process that incorporates ion exchange processes in order to remove impurities from water. Deionization of water to an electrical resistance of about 18.2 million ohms-cm is known as complete deionization and constitutes "high purity water."

To perform deionization, water is passed through a resin bed. The resin bed serves to remove impurities. Resin beds have limited functionality, which can be restored by contacting the spent resin with the appropriate acid and/or base to remove the impurities from the spent resin. Regeneration of resins, particularly of mixed bed resins, can be tedious, as it generally requires removal and separation of the resin into the two (or more) individual resins.

Deionization of water generally has been performed in vessels reinforced with mineral fibers (e.g., glass fibers) with a head sealing a single opening of the vessels. The head typically has three ports: an inlet port, an outlet port, and a utility port. The outlet port of the head is generally outfitted with a downpipe and outlet screen to allow deionized water to be forced from the deionization vessel without removing the resin in the process. However, the process of recharging the assembly (i.e., removing spent resin from the vessel and replacing it with functional resin) with the head attached to the vessel is inefficient, usually requiring human intervention to remove the spent resin. For example, the assembly may need to be inverted to allow spent resin to pour from one or more of the openings of the head. Furthermore, delivery of a new functional resin bed using such a head configuration provides inconsistent and unreliable results at least in part because the new functional resin bed is delivered from the utility port, which without modification, is incapable of delivering a base layer of the functional resin to the lower portion of the vessel.

Often assemblies recharged in this manner are incapable of meeting the about 18.2 million ohms-cm resistance quality standard required of deionized water for certain applications. Recharged assemblies are not put into service for these certain applications unless the recharged assemblies can achieve the resistance quality standard and must be "re-recharged," which is no more reliable than the previous recharging.

SUMMARY

An apparatus adapted to contain resin utilized for deionizing water is provided. The apparatus comprises a vessel having an inner side defining an interior. A first transfer port defines an inlet passage configured to pass water into the interior of the vessel. A second transfer port defines an outlet passage configured to pass water from the interior of the vessel, when pressurized. The outlet passage extends from the inner side into the interior of the vessel to an outlet passage terminus such that, when a resin bed is present in the interior of the vessel, the outlet passage terminus is positioned in the resin bed. The outlet passage terminus is configured to prevent resin from escaping the vessel during production of deionized water while allowing deionized water to escape the vessel via the outlet passage. A third transfer port defines a resin transfer passage configured to pass resin from the interior of the vessel during a recharging cycle. The resin transfer passage extends from the inner side of the vessel into the interior of the vessel to a resin transfer passage terminus such that, when the resin bed is present in the interior of the vessel, the resin transfer passage terminus is positioned in the resin bed. The resin transfer passage comprises an upper opening, a lower opening, and an intermediate opening beyond the inner side and above the lower opening.

A head adapted to be sealably attached to a vessel is also provided. The head comprises an outer side, an inner side, and at least three transfer ports. A first transfer port defines an inlet passage configured to pass water through the head. A second transfer port defines an outlet passage configured to pass water from the vessel, when pressurized, through the head. The outlet passage extends from the inner side of the head to an outlet passage terminus such that, when the head is attached to the vessel, and a resin bed is present in the interior of the vessel, the outlet passage terminus is positioned in the resin bed. The outlet passage terminus is configured to prevent resin from escaping the vessel during production of deionized water while allowing deionized water to escape the vessel via the outlet passage. A third transfer port defines a resin transfer passage configured to pass resin through the head during recharging. The resin transfer passage extends from the inner side of the head to a resin transfer passage terminus such that, when the head is attached to the vessel, and the resin bed is present in the interior of the vessel, the resin passage terminus is positioned in the resin bed. The resin transfer passage comprises an upper opening, a lower opening, and an intermediate opening beyond the inner side of the head and above the lower opening.

A method of recharging a deionization apparatus is also provided. The deionization apparatus comprises a vessel having a lower portion and an upper portion. The vessel is equipped with an inlet passage and a resin transfer passage extending into the lower portion of the vessel. The method comprises forcing spent resin from the vessel by introducing water into the vessel via the inlet passage. The water is introduced under conditions sufficient to drive the resin from the vessel via the lower opening of the resin transfer passage. Optionally, at least a portion of the water may be removed from the vessel. Functional resin is supplied to the vessel by delivering a base layer of the functional resin to the lower portion of the vessel. The upper portion of the vessel is then filled with functional resin by allowing the functional resin to pour onto the base layer.

DETAILED DESCRIPTION

Figure 1A:
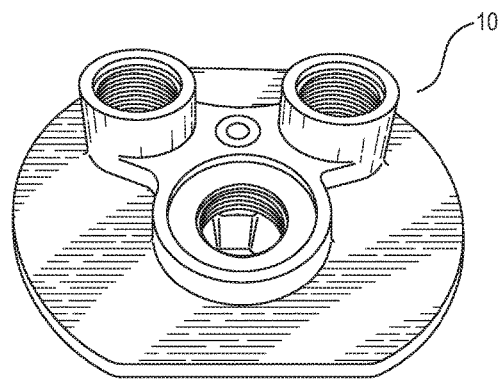
FIG. 1a is a top view of a prior art head of an apparatus utilized to deionize water.
Figure 1B:
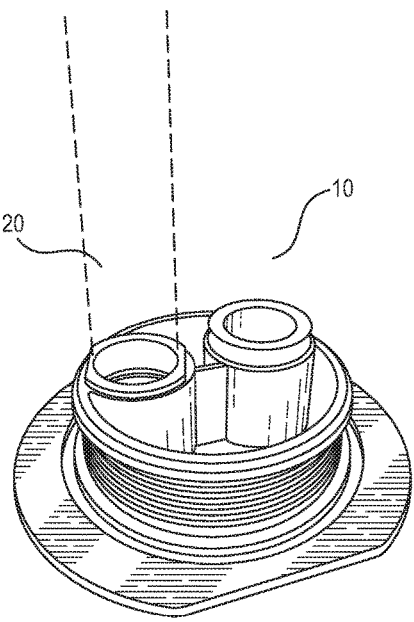
FIG. 1b is a bottom view of a prior art head of an apparatus utilized to deionize water.
Figure 1C:
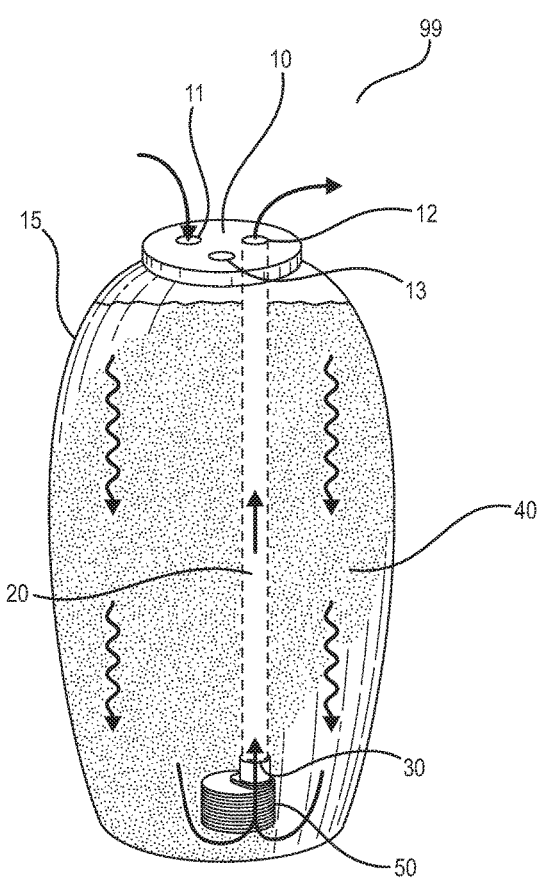
FIG. 1c is a perspective view of an assembly incorporating the prior art head of FIGS. 1a and 1b.

Deionization of water generally has been performed in vessels reinforced with mineral fibers (e.g., glass fibers) with a head sealing a single opening of the vessels. FIGS. 1a and 1b provide a top view and a bottom view, respectively, of an illustrative prior art head 10. FIG. 1c is a perspective view of an assembly 99 incorporating head 10 of FIGS. 1a and 1b sealably attached to a deionization vessel 15. Head 10 comprises three ports: an inlet port 11, an outlet port 12, and a utility port 13. Outlet port 12 of head 10 is generally outfitted with downpipe 20 and outlet screen 30 to allow deionized water to be forced from the deionization vessel without removing the resin in the process. Head 10 connects to a deionization vessel comprising functional resin (e.g., resin bed 40). Resin is retained by assembly 99 at least in part because of lower outlet screen 50. Assembly 99 is capable of carrying out deionization of water, which is represented by the flow arrows in FIG. 1c, but not always to the purity required for certain applications.

In addition, the process of recharging the assembly (i.e., removing spent resin from the vessel and replacing it with functional resin) with head 10 attached to the vessel is inefficient, usually requiring human intervention to remove the spent resin. For example, the assembly may need to be inverted to allow spent resin to pour from one or more of the openings of the head. Furthermore, delivery of a new functional resin bed using head 10 provides inconsistent and unreliable results at least in part because the new functional resin bed is delivered from utility port 13. Utility port 13, without modification, is incapable of delivering a base layer of the functional resin to the lower portion of the vessel.

An improved head and apparatus for use in deionizing water are provided. The disclosed head allows for the complete removal of resin from a deionization vessel without removing the head from the vessel, and furthermore, without the need to flip the deionization vessel or to require substantial intervention by a user. The apparatus comprises a vessel having an inner side defining an interior. A first transfer port defines an inlet passage configured to pass water into the interior of the vessel. A second transfer port defines an outlet passage configured to pass water from the interior of the vessel, when pressurized. The outlet passage extends from the inner side into the interior of the vessel to an outlet passage terminus such that, when a resin bed is present in the interior of the vessel, the outlet passage terminus is positioned in the resin bed. The outlet passage terminus is configured to prevent resin from escaping the vessel during production of deionized water while allowing deionized water to escape the vessel via the outlet passage. A third transfer port defines a resin transfer passage configured to pass resin from the interior of the vessel during a recharging cycle. The resin transfer passage extends from the inner side of the vessel into the interior of the vessel to a resin transfer passage terminus such that, when the resin bed is present in the interior of the vessel, the resin transfer passage terminus is positioned in the resin bed. The resin transfer passage comprises an upper opening, a lower opening, and an intermediate opening beyond the inner side and above the lower opening.

The head is adapted to be sealably attached to a vessel. The head comprises an outer side, an inner side, and at least three transfer ports. A first transfer port defines an inlet passage configured to pass water through the head. A second transfer port defines an outlet passage configured to pass water from the vessel, when pressurized, through the head. The outlet passage extends from the inner side of the head to an outlet passage terminus such that, when the head is attached to the vessel, and a resin bed is present in the interior of the vessel, the outlet passage terminus is positioned in the resin bed. The outlet passage terminus is configured to prevent resin from escaping the vessel during production of deionized water while allowing deionized water to escape the vessel via the outlet passage. A third transfer port defines a resin transfer passage configured to pass resin through the head during recharging. The resin transfer passage extends from the inner side of the head to a resin transfer passage terminus such that, when the head is attached to the vessel, and the resin bed is present in the interior of the vessel, the resin passage terminus is positioned in the resin bed. The resin transfer passage comprises an upper opening, a lower opening, and an intermediate opening beyond the inner side of the head and above the lower opening.

A method of recharging a deionization apparatus is also provided. The deionization apparatus comprises a vessel having a lower portion and an upper portion. The vessel is equipped with an inlet passage and a resin transfer passage extending into the lower portion of the vessel. The method comprises forcing spent resin from the vessel by introducing water into the vessel via the inlet passage. The water is introduced under conditions sufficient to drive the resin from the vessel via the lower opening of the resin transfer passage. Optionally, at least a portion of the water may be removed from the vessel. Functional resin is supplied to the vessel by delivering a base layer of the functional resin to the lower portion of the vessel. The upper portion of the vessel is then filled with functional resin by allowing the functional resin to pour onto the base layer.

As described herein, the resin may comprise a mixed bed, and the embodiments presented herein are particularly suited for producing high purity water using a mixed bed. In order to regenerate the resins, the mixed bed must be removed from the vessel. The removed resin is then separated into anionic resin and cationic resin, with each resin regenerated using the appropriate chemistry (acid or base) in a separate process. Generally, the step of regeneration is performed at a larger scale than a single deionization vessel, e.g., resins from multiple deionization apparatuses are combined together, regenerated, remixed, and recharged into deionization vessels for redistribution to end users. However, the resin of a single vessel could be regenerated and recharged into the same deionization vessel. As generally described herein, the "timing bottleneck" of the recharging process is the removal of spent resin from a deionization vessel, and the "quality bottleneck" of the recharging process is the failure of the regenerated resin to be dispensed into the deionization vessel while being adequately mixed and dispersed in the lower portion of the deionization vessel. The inventions described herein solve both of these bottlenecks.

Figure 2:
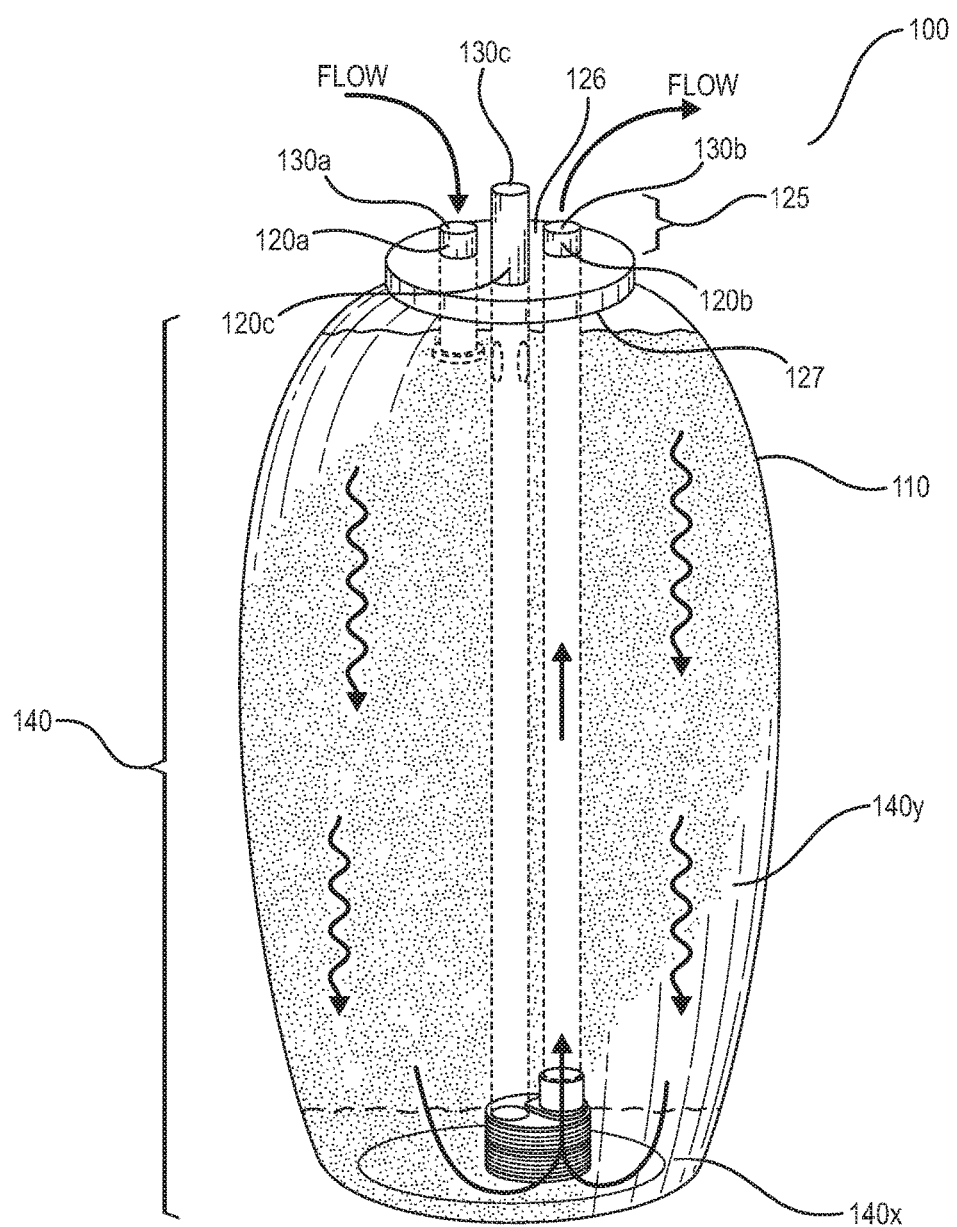
FIG. 2 is a perspective view of an embodiment of an apparatus utilized to deionize water.

In certain embodiments, the apparatus comprises a deionization vessel and a head sealably attached to the deionization vessel. FIG. 2 provides a perspective view of an embodiment of an apparatus utilized to deionize water.

Apparatus 100 comprises vessel 110, first transfer port 120a, second transfer port 120b, and third transfer port 120c. Transfer ports can be provided to apparatus 100 via head 125. In another embodiment, apparatus 100 is manufactured so as to include "built-in" transfer ports 120a, 120b, and 120c. The terms "vessel" and "deionization vessel" are used interchangeably. Furthermore, FIG. 2 illustrates apparatus in operation mode, i.e., while producing deionized water (see flow represented by arrows).

Deionization vessel 110 is adapted to contain resin bed 140, and is capable of performing water deionization. Resin that is capable of performing water deionization may be described as "functional resin." Resin has limited functionality in purifying water and from time to time may be regenerated using at least one of an acid and a base. Once the functional resin's capability of performing ion exchange has been depleted, the resin may be referred to as "spent resin." In certain embodiments, the resin comprises a mixed bed of anionic and cationic resin. In certain embodiments, the mixed bed comprises functional resin that is capable of providing water having an electrical resistivity of about 18.2 million ohms-cm (i.e., high purity water).

Resin suitable for use with the disclosed embodiments includes cationic resin, anionic resin, and combinations thereof. A mixture of cationic resin and anionic resin is particularly suitable for use in the disclosed apparatus and methods. Cationic resin is acidic in that it replaces cations present in water with hydrogen ions, and anionic resin is basic in that it replaces anions present in water with hydroxyl ions. Certain mixed beds comprise a mixture of cationic and anionic resins, and sometimes strong acid cationic resin and strong base anionic resin. In certain embodiments, the resins are derived from at least one of a polymer comprising styrene and divinylbenzene monomers functionalized with a trimethylamine group and a polymer comprising acrylic and divinylbenzene monomers functionalized with a carboxylic acid group, with each resin appropriately charged to provide ion exchange. The resins may be mixed at a volumetric ratio of cationic-to-anionic resin of from about 5:1 to about 1:5, including from about 5:1, or from about 4:1, or from about 3:1, or from about 2:1, to about 1:5, or to about 1:4, or to about 1:3, or to about 1:2, or to about 1:1. In certain embodiments, the resins are mixed at a volumetric ratio of cationic-to-anionic resin of about 1:1.

Cationic resin and anionic resin that make up the mixed resin bed are generally supplied in the form of solid granules. In certain embodiments, the solid granules have a mean particle size of from about 0.1 mm to about 1 mm. In certain embodiments, the solid granules have a water retention of from about 50% to about 65%, as compared to the weight of the solid granules. In other words, when saturated with water, the solid granules weigh about 1.5 times to about 1.65 times the dry weight of the solid granules.

The size and capacity of the deionization vessel can be determined according to the demand required by the end use. In certain embodiments, the deionization vessel has a volume of from about 0.1 cubic feet to about 50 cubic feet, including from about 0.1 cubic feet, or from about 1 cubic feet, to about 50 cubic feet, or to about 10 cubic feet. The apparatus may be incorporated into a system that is capable of producing from about 10 gallons of deionized water per day to about 100,000 gallons of deionized water per day, for a period of time of from about 1 day to about 365 days.

The vessel may be constructed of any suitable material that can contain the deionized water and resin without degradation. Desirably, the vessel will be constructed of a material that does not contaminate the deionized water (e.g., deionized water leaving the vessel has a resistance of at least about 18.2 million ohms-cm). The vessel can be constructed of a non-contaminating material that is light-weight (e.g., having a density of from about 0.03 lb/in$^3$ to about 0.08 lb/in$^3$), such that the vessel can be easily transported from place to place. In certain embodiments, the vessel is constructed of stainless steel, high purity plastic reinforced with mineral fibers, and high purity plastic reinforced with carbon steel. In certain embodiments, the vessel is constructed of high purity plastic reinforced with mineral fibers. In certain embodiments, the mineral fibers comprise glass (e.g., fiberglass). Examples of "high purity plastic" include, but are not limited to, plastics that are manufactured so as to include a relatively low amount of antioxidants, pigments, and other substances that may contaminate high purity water as described herein. In certain embodiments, the vessel has a seamless construction.

Figures 3A, 3B:
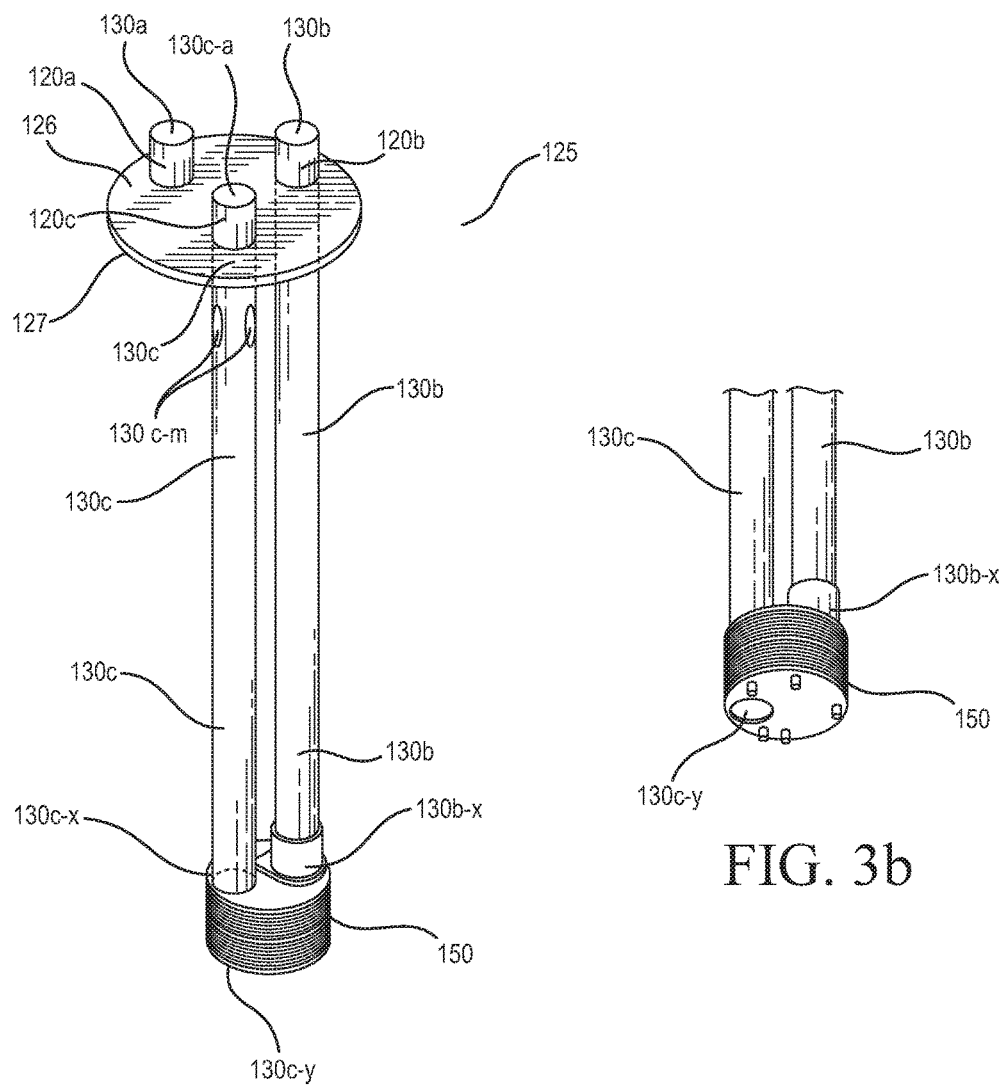
FIG. 3a is a perspective view of an embodiment of a head adapted to be sealably attached to a deionization vessel.
FIG. 3b is a bottom view of an embodiment of an outlet passage equipped with an optional outlet screen, and a resin transfer passage.

FIG. 3a is a perspective view of head 125. As shown in FIG. 3a, head 125 comprises outer side 126 and inner side 127. First transfer port 120a defines inlet passage 130a, which in certain embodiments is configured to be attached to a water supply. Inlet passage 130a is configured to pass water through the head. While not wishing to be limited to any single embodiment, head 125 may be sealably attached to existing deionization vessels in order to carry out the methods of the present disclosure.

Second transfer port 120b defines outlet passage 130b, which is configured to pass water from deionization vessel 110, when pressurized, through head 125 via outlet passage 130b. Outlet passage 130b extends from inner side 127 of head 125 to outlet passage terminus 130b-x. Outlet passage terminus 130b-x should be configured to prevent resin from escaping deionization vessel 110 during operation, while allowing deionized water to escape deionization vessel 110 through head 125 via outlet passage 130b.

Third transfer port 120c defines resin transfer passage 130c, which is configured to pass resin through head 125, e.g., during a recharge cycle. For the embodiment shown in FIGS. 3a and 3b, resin transfer passage 130c extends from inner side 127 of head 125 to resin transfer passage terminus 130c-x. As illustrated, resin passage 130c comprises lower opening 130c-y, upper opening 130c-a, and intermediate opening 130c-m. As illustrated, resin transfer passage 130c includes at least two intermediate openings 130c-m. For embodiments of resin transfer passage 130c having intermediate openings 130c-m, closing intermediate openings 130c-m provides a resin transfer passage 130c that is configured to pass forced spent resin from vessel 140. Resin transfer passage 130c, as illustrated or with closed or without intermediate openings 130c-m, is configured to supply functional resin to the vessel by delivering a base layer (e.g., base layer 140x of FIGS. 5b and 5c) of the functional resin to the lower portion of vessel 140.

As illustrated, intermediate openings 130c-m are located beyond inner side 127 of head 125 and above lower opening 130c-y. In certain embodiments, intermediate opening 130c-m is located within about 50 cm from which resin transfer passage 130c extends from inner side 127, including within about 40 cm, and including within about 30 cm, and including within about 20 cm, and including within about 10 cm, from which resin transfer passage 130c extends from inner side 127. In certain embodiments, outlet passage 130b and resin transfer passage 130c extend approximately an equal distance from inner side 127.

In certain embodiments, a fourth transfer port, or, e.g., n-number of transfer ports, may be utilized to provide a plurality of resin transfer passages. The plurality of resin transfer passages may be utilized to carry out the methods described herein. For example, one or more resin transfer passages may be utilized to carry out the forcing step, while one or more of the same or different resin transfer passages may be utilized to carry out the supplying step.

Head 125 will generally be constructed of a rigid material suitable for use in ion exchange water service. Head 125 should be constructed of material that is capable of being sealably attached to deionization vessel 110 such that the sealed vessel can be pressurized at from about 1 psig to about 125 psig. In certain embodiments, the head is constructed of a material comprising ethylene propylene diene terpolymer ("EPDM"), polyphenylene ether resin, polystyrene (e.g., NORYL™ resin, marketed by SABIC Innovative Plastics), or a combination thereof. In certain embodiments, head 125 is constructed of either EPDM or polyphenylene ether resin. In certain embodiments, head 125 is constructed of polyphenylene ether resin and is sealed to a deionization vessel 110 using o-rings constructed of EPDM.

Figure 4:
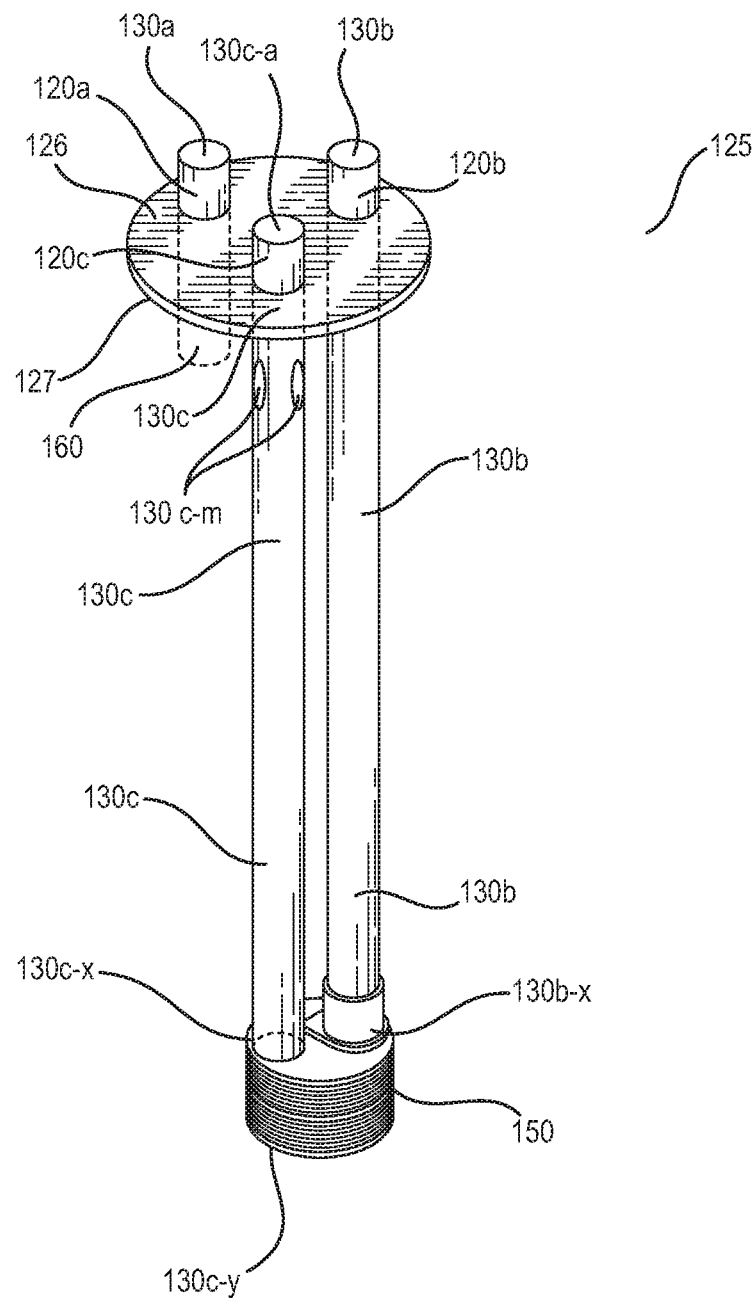
FIG. 4 is a perspective view of an alternate embodiment of a head adapted to be sealably attached to a deionization vessel.

As shown in FIGS. 2-4, outlet passage 130*b* and resin transfer passage 130*c* extend from inner side 127 and are substantially parallel to each other. Resin transfer passage 130*c* extends to resin transfer passage 130*c-x* such that, when head 125 is attached to, e.g., vessel 110, and the interior of vessel 110 comprises a resin bed (e.g., base layer 140*x*+upper portion 140*y*), resin transfer passage terminus 130*c-x* is positioned in the resin bed. In certain embodiments, resin transfer passage 130*c* extends a length of at least half the height of vessel 110. In certain embodiments, when base layer 140*x* is present in the interior of vessel 110, resin transfer passage terminus 130*c-x* is positioned in base layer 140*x*. In certain embodiments, outlet passage terminus 130*b-x* of vessel 110 is located at a distance of from about 0.1 inch (e.g., about 0.25 cm) to about 5 inches (e.g., about 12.7 cm) from the floor of the vessel. In certain embodiments, resin transfer passage terminus 130*c-x* (and hence, lower opening 130*c-y*) is located at a distance of from about 0.1 inch (e.g., about 0.25 cm) to about 5 inches (e.g., about 12.7 cm) from the floor of the vessel, including from about 0.5 inch (e.g., about 1.3 cm), or from about 1 inch (e.g., about 2.5 cm), to about 3 inches (e.g., about 7.6 cm), or to about 2 inches (e.g., about 5.1 cm).

FIGS. 3*a* and 3*b* show outlet passage 130*b* and resin transfer passage 130*c* operably connected to each other via lower outlet screen 150 at outlet passage terminus 130*b-x* and resin transfer passage terminus 130*c-x*. As shown, lower outlet screen 150 is in fluid communication with outlet passage 130*b* and is configured to prevent resin from passing through outlet passage 130*b* while allowing water to pass through outlet passage 130*b*.

FIG. 4 represents an alternate embodiment and shows inlet passage 130*a* in fluid communication with upper inlet screen 160. Upper inlet screen 160 is configured to prevent resin from passing through inlet passage 130*a* while allowing water to pass through inlet passage 130*a*. Upper inlet screen 160, when present, may serve the purpose of a check valve, thereby preventing backflow of ion exchange resin out inlet passage 130*a*, e.g., during a process upset.

Generally, the resin transfer passage is operational only during recharging activities. During production of deionized water, the resin transfer passage is rendered inoperable to transfer resin from the deionization vessel. Accordingly, the resin transfer passage may be plugged, capped, or valved "off" during production of deionized water.

During production of deionized water, the various transfer ports are outfitted with connectors configured to correctly connect to each of a water supply line and a deionized water exit stream. The deionized water produced by the apparatus or methods disclosed herein may be immediately placed into service or stored in an appropriate storage vessel.

Ideally, during the recharging process, the various transfer ports can be connected in an efficient manner as necessary to a recharging system that can, e.g., introduce water via the inlet passage under conditions sufficient to drive the resin through the resin transfer passage and from the vessel, which generally requires the third transfer port to be connected to and in fluid communication with a resin outlet stream. During the recharging process, the outlet passage is generally closed, e.g., via a plug, cap, or valve in the "off" position. In certain embodiments, the various transfer ports are "keyed," which is described herein.

Figure 5A:
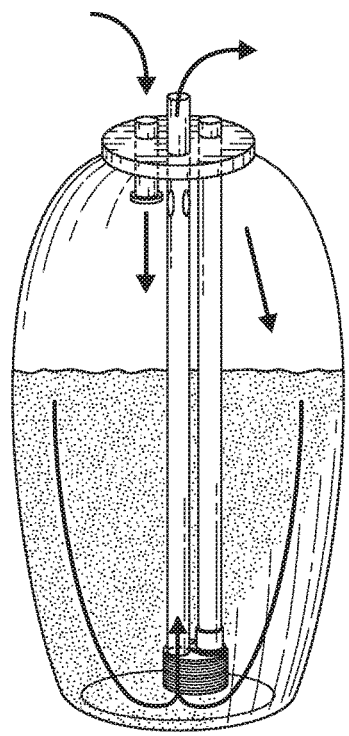
FIGS. 5a-c show schematic views of an embodiment of a recharging cycle.
Figure 5B:
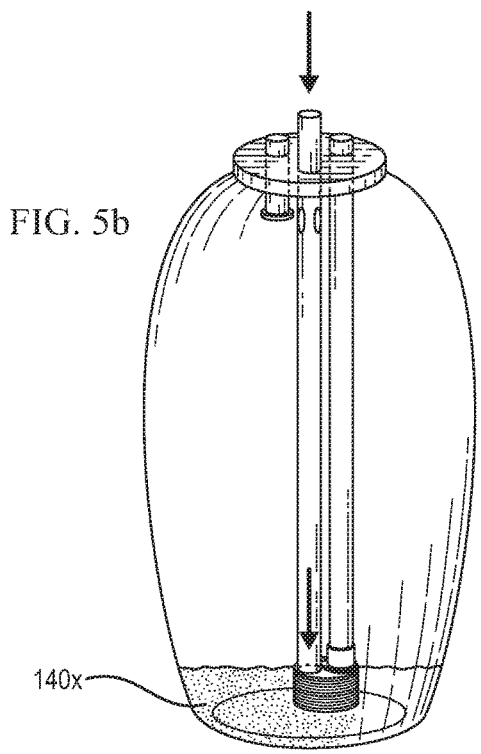
Figure 5C:
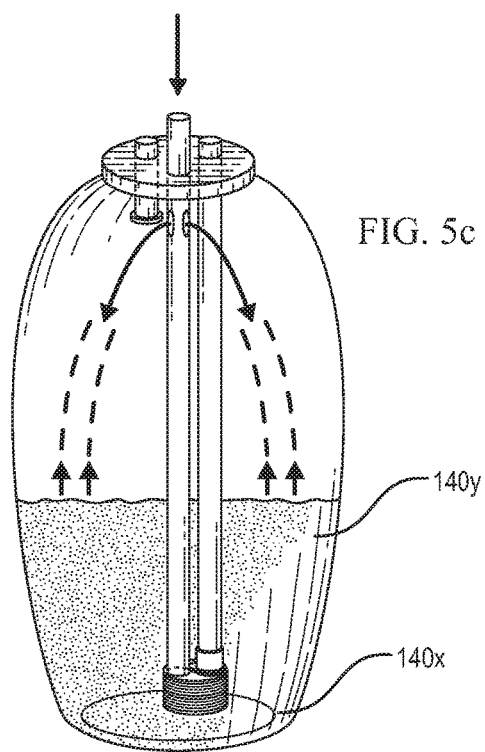

A method of recharging a deionization apparatus is provided, and a schematic of such a method is shown in FIGS. 5*a-c*. The method may be carried out using an apparatus as shown in FIG. 2 and as described herein. As illustrated by FIG. 5*a*, the method comprises forcing spent resin from the deionization vessel by introducing water via, e.g., inlet passage 130*a*. The water is introduced under conditions sufficient to drive the resin through the resin transfer passage (e.g., resin transfer passage 130*c*) and from the deionization vessel (e.g., deionization vessel 110). Generally, at least a portion of the water is removed from the deionization vessel.

Turning to FIGS. 5*b-c*, functional resin is then supplied to the deionization vessel by delivering a base layer 140*x* of functional resin to the lower portion of the deionization vessel, followed by filling the upper portion of the deionization vessel by allowing the functional resin to pour onto the base layer, as denoted in the figures as upper portion 140*y*.

To drive the resin through the resin transfer passage, water can be supplied to the inlet passage 130*a* at a pressure of from about 1 psig to about 125 psig, including from about 10 psig, or from about 20 psig, to about 100 psig, or to about 80 psig. The water may be supplied at a flow rate of from about 1 gallon per minute to about 100 gallons per minute, including from about 3 gallons per minute, or from about 5 gallons per minute, to about 50 gallons per minute, or to about 20 gallons per minute. Turbulent flow of water into the vessel generally aids in driving the resin through the resin transfer passage in a more efficient manner. In certain embodiments, the water has a Reynolds number of from about 700 to about 420,000, including from about 1000, or from about 1200, to about 100,000, or to about 10,000, when entering the vessel via the inlet passage.

The water supplied during the forcing step should be done so to sufficiently remove all resin from the vessel in a reasonably short period of time. In certain embodiments, air is added to the water being utilized to drive the resin through the resin transfer passage, which further aids in efficiently driving the resin through the resin transfer passage. Optionally, the resin transfer passage may be in fluid communication with a vacuum line, which, when combined with the force of the water supplied to the inlet passage, achieves the removal of all spent resin in a reasonably short period of time. Ideally, all resin is removed from the vessel in a period of time ranging from about 2 minutes to about 10 minutes, including from about 3 minutes, or from about 4 minutes, to about 8 minutes, or to about 6 minutes, and ideally without tipping the vessel or substantial human intervention (e.g., disconnecting the head or other opening of the vessel).

Once the spent resin is removed from the vessel, functional resin is supplied to the vessel. Particularly for mixed beds, it is important to supply a base layer to the lower portion of the vessel that remains well-mixed. It has been discovered that providing a base layer to the lower portion of the vessel via a resin transfer passage as described herein provides the well-mixed base layer as described. In certain embodiments, a base layer of functional mixed resin is delivered to the lower portion of the vessel (e.g., to the floor of the vessel) via the lower opening of the resin transfer passage, and the upper portion of the vessel is filled by allowing the functional resin to pour onto the base layer. In certain embodiments, the upper portion of the vessel is filled by allowing the functional resin to pour onto the base layer via an intermediate opening of the resin transfer passage. When delivering the functional resin in this manner, the base layer of the functional resin will eventually build to the point when the functional resin will fill the resin transfer passage, unable to escape via the lower opening. As the point of least resistance, the functional resin will spill from any intermediate opening of the resin transfer passage and onto the base layer, thereby completing the recharging process. The term "filled" is used to describe the resin in the vessel, which is intended to denote that the vessel contains at least an initial amount of functional resin to provide deionized water.

Utilization of the apparatuses disclosed herein allows for the complete removal of the resin from the deionization vessel without removing the head from the vessel, and furthermore, without the need to flip the deionization vessel or to require substantial intervention by a user. Furthermore, utilization of a resin transfer passage having a lower opening, an upper opening, and an intermediate opening allows for mixed resin to be delivered to the lower portion of the deionization vessel (e.g., the floor), thereby forming a base layer that maintains substantially uniform mixing of cationic resin and anionic resin, which provides nearly ideal deionization of water leaving the vessel via the outlet passage. Uniform mixing of cationic resin and anionic resin at the base layer is critical because the base layer performs a polishing function: further removing trace impurities from already somewhat pure water to achieve a resistance of about 18.2 million ohms-cm. In certain embodiments of the methods, the portion of the vessel located above the base layer is filled via an intermediate opening of the resin transfer passage. The heads, apparatuses, and methods of the present disclosure allow for reduced human intervention over previous equipment and methods. Furthermore, the heads, apparatuses, and methods allow the recharging of the deionization apparatus to be conducted significantly more efficiently than the previous equipment and methods allowed.

The supply of functional resin may be delivered according to any suitable pouring mechanism configured to deliver the supply to the vessel, which, for example, may be delivered via the resin transfer passage. In certain embodiments, the functional resin is supplied as a slurry in water. For example, the resin may be supplied at a rate of from about 0.1 ft$^3$ per minute to about 10 ft$^3$ per minute, including from about 0.5 ft$^3$ per minute, or from about 1 ft$^3$ per minute, to about 8 ft$^3$ per minute, or to about 5 ft$^3$ per minute. Ideally, the functional resin is supplied at a substantially constant mass flow rate until the vessel is full as described herein.

In certain embodiments of the methods, a removal fitting is attached to resin transfer passage 130c during the forcing step such that any intermediate opening 130c-m is closed by the removal fitting. Thus, the resin is removed from vessel 110 and, e.g., transported to a separating system that separates the cationic resin and the anionic resin.

In certain embodiments, the methods disclosed herein are capable of recharging a deionization apparatus in an elapsed time of less than about 20 minutes, which can be in less than about 15 minutes. In certain embodiments, the method of recharging a deionization apparatus is conducted in a period of time of from about 3 minutes to about 20 minutes, while providing a recharged deionization apparatus capable of purifying water to a resistance of about 18.2 ohms-cm.

In carrying out the methods, it is important that an end user correctly connect the various transfer ports to the proper input or output connections. In certain embodiments, the various transfer ports are "keyed," in that they have a particular type of connector fitting that can only be connected to a certain "matching" connector fitting. For example, first transfer port 120a may be outfitted with a ¾ in female banjo connector, second transfer port 120b may be outfitted with a ¾ in male banjo connector, and third transfer port 120c may be outfitted with a standard 1 in NPT coupling connector, with each transfer port being paired with a corresponding connector of a system designed to perform the removal of resin from the vessel (e.g., forcing spent resin from the vessel) and recharging functional resin into the vessel (e.g., supplying functional resin to the vessel). The transfer ports may be outfitted in this manner in order to reduce (and ideally eliminate) the possibility of operator error associated with incorrectly connecting the deionization apparatus to a recharging system.

EXAMPLE

Two 14-inch diameter by 47-inch tall deionization vessels were each filled with 3.5 ft$^3$ of spent mixed bed resin and needed to be evacuated and filled with recharged mixed bed resin. The first of the two deionization vessels, labeled "Control" in Table 1 below, was outfitted with a prior art head as illustrated in FIGS. 1a-1c. The second of the two deionization vessels, labeled "A" in Table 1 below, was outfitted with an inventive head as illustrated in FIGS. 2-5c. In order to evacuate the spent resin from the first deionization vessel, a separate external tube was inserted through utility port 13 until it was within about 1 inch from the floor of the control vessel. 50 psig of a combination water and air pressure was applied to inlet port 11, thereby forcing the spent mixed bed resin out the external tube. The entire resin removal process, from insertion of the external tube to removing the last granule of spent mixed bed resin took 4 minutes and 22 seconds.

Once the control vessel was evacuated, recharged mixed bed resin of strong acid cationic resin and strong base anionic resin was added to the deionization vessel via utility port 13 of the prior art head, resulting in an unpredictable fill of the recharged mixed bed resin (e.g., sometimes causing separation of the cationic resin from the anionic resin, sometimes causing air pockets to form in the resin bed). Filling the control vessel with the recharged mixed bed resin took 1 minute and 10 seconds, for an overall process time of 5 minutes and 32 seconds. The recharged control deionization vessel achieved a water quality (i.e., electrical resistance) of 17 million ohms-cm. This result would require that the control vessel be re-evacuated and refilled in an attempt to reach a resistance of 18.2 million ohms-cm.

For the vessel A, the spent mixed bed resin was evacuated by blocking intermediate openings 130c-m and attaching a conduit (e.g., a hose) to resin transfer passage 130c at the upper opening 130c-a. 50 psig of a combination water and air pressure is applied to inlet passage 130a, thereby forcing the spent mixed bed resin out the resin transfer passage.

Evacuating the resin from vessel A took 2 minutes and 6 seconds. Intermediate openings 130*c-m* were subsequently unblocked.

Once evacuated, vessel A was filled with mixed bed resin having the same specifications as that of the control vessel. Vessel A was recharged by pressure-filling recharged mixed bed resin via resin transfer passage 130*c*, causing the initially-supplied resin to fill the lower portion of vessel A (e.g., base layer 140*x*) until the resin transfer passage back-filled with recharged mixed bed resin. Once back-filled, the remaining supply of recharged mixed bed resin poured over base layer 140*x* via intermediate openings 130*c-m* to form upper portion 140*y*. Filling vessel A with the recharged mixed bed resin took 50 seconds, for an overall process time of 2 minutes and 56 seconds. The recharged deionization vessel A achieved a water quality (i.e., electrical resistance) of 18.2 million ohms-cm.

Four further vessels (B-E in Table 1 below) equipped with the head of FIGS. 2-5*c* were evacuated and recharged according to the protocols used for vessel A, with the timing and quality data shown below.

TABLE 1

Examples of Recharges

| Vessel | Evacuation Time (min:sec) | Recharge Time (min:sec) | Resistance of Output Water (million ohms-cm) | High Purity Pass/ Fail ? |
|---|---|---|---|---|
| Control | 4:22 | 1:10 | 17 | Fail |
| A | 2:06 | 0:50 | 18.2 | Pass |
| B | 2:10 | 0:50 | 18.2 | Pass |
| C | 2:08 | 0:52 | 18.2 | Pass |
| D | 2:30 | 0:55 | 18.2 | Pass |
| E | 2:14 | 0:52 | 18.2 | Pass |

All references, including publications, patent applications, and patents, cited herein are hereby incorporated by reference to the same extent as if each reference were individually and specifically indicated to be incorporated by reference and were set forth in its entirety herein.

The phrase "in certain embodiments" is utilized herein to indicate in certain embodiments of the head, apparatus, and/or methods described herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A head adapted to be sealably attached to a vessel having an interior, the head comprising:
    an outer side;
    an inner side;
    a first transfer port defining an inlet passage configured to pass water through the head;
    a second transfer port defining an outlet passage configured to pass water from the vessel, when pressurized, through the head, the outlet passage extending from the inner side of the head to an outlet passage terminus such that, when the head is attached to the vessel, and a resin bed is present in the interior of the vessel, the outlet passage terminus is positioned in the resin bed, the outlet passage terminus configured to prevent resin from escaping the vessel during production of deionized water while allowing deionized water to escape the vessel via the outlet passage; and
    a third transfer port defining a resin transfer passage configured to pass resin through the head, the resin transfer passage extending from the inner side of the head to a resin transfer passage terminus such that, when the head is attached to the vessel, and the resin bed is present in the interior of the vessel, the resin transfer passage terminus is positioned in the resin bed, the resin transfer passage comprising an upper opening, a lower opening, and an intermediate opening beyond the inner side of the head and above the lower opening.

2. The head of claim 1, wherein the intermediate opening is located within about 50 cm from which the resin transfer passage extends from the inner side of the head.

3. The head of claim 1, wherein the resin transfer passage comprises at least two intermediate openings.

4. The head of claim 1, wherein the head is constructed of polyphenylene ether resin.

5. The head of claim 1, wherein the outlet passage and the resin transfer passage extend parallel to each other.

6. The head of claim 1, wherein the outlet passage and the resin transfer passage are operably connected to each other via a lower outlet screen in fluid communication with the outlet passage, the lower outlet screen configured to prevent resin from passing through the outlet passage while allowing water to pass through the outlet passage.

7. The head of claim 1, wherein the inlet passage is in fluid communication with an upper inlet screen configured to prevent resin from passing through the inlet passage while allowing water to pass through the inlet passage.

8. An apparatus adapted to contain a resin bed utilized for deionizing water, the apparatus comprising:
- a vessel having an inner side defining an interior;
- a first transfer port defining an inlet passage configured to pass water into the interior of the vessel;
- a second transfer port defining an outlet passage configured to pass water from the interior of the vessel, when pressurized, the outlet passage extending from the inner side into the interior of the vessel to an outlet passage terminus such that, when a resin bed is present in the interior of the vessel, the outlet passage terminus is positioned in the resin bed, the outlet passage terminus configured to prevent resin from escaping the vessel during production of deionized water while allowing deionized water to escape the vessel via the outlet passage; and
- a third transfer port defining a resin transfer passage configured to pass resin from the interior of the vessel during a recharging cycle, the resin transfer passage extending from the inner side of the vessel into the interior of the vessel to a resin transfer passage terminus such that, when the resin bed is present in the interior of the vessel, the resin transfer passage terminus is positioned in the resin bed, the resin transfer passage comprising an upper opening, a lower opening, and an intermediate opening beyond the inner side and above the lower opening.

9. The apparatus of claim 8, wherein the vessel comprises stainless steel, high purity plastic reinforced with mineral fibers, high purity plastic reinforced with carbon steel, or a combination thereof.

10. The apparatus of claim 8, wherein the vessel has a seamless construction.

11. The apparatus of claim 8, wherein the intermediate opening is located within about 50 cm from which the resin transfer passage extends from the inner side of the vessel.

12. The apparatus of claim 8, wherein the resin transfer passage comprises at least two intermediate openings.

13. The apparatus of claim 8, wherein the outlet passage and the resin transfer passage extend parallel to each other.

14. The apparatus of claim 8, wherein the outlet passage and the resin transfer passage are operably connected to each other via a lower outlet screen in fluid communication with the outlet passage and configured to prevent resin from passing through the outlet passage while allowing water to pass through the outlet passage.

15. The apparatus of claim 8, wherein the inlet passage is in fluid communication with an upper inlet screen configured to prevent resin from passing through the inlet passage while allowing water to pass through the inlet passage.

16. The apparatus of claim 8, wherein the resin transfer passage extends a length of at least half the height of the vessel.

17. The apparatus of claim 8, wherein, when a base layer of the resin bed is present in the interior of the vessel, the resin transfer passage terminus is positioned in the base layer.

18. A method of recharging a deionization apparatus, the deionization apparatus comprising a vessel having a lower portion and an upper portion, the vessel equipped with an inlet passage and a resin transfer passage extending into the lower portion of the vessel, the resin transfer passage comprising an upper opening located outside the vessel, a lower opening located inside the vessel proximate a bottom interior surface of the vessel, and an intermediate opening located inside the vessel and above the lower opening, the method comprising:
- forcing spent resin from the vessel by introducing water into the vessel via the inlet passage, the water introduced under conditions sufficient to drive the resin from the vessel via the lower opening of the resin transfer passage;
- optionally removing at least a portion of the water from the vessel; and
- supplying functional resin to the vessel by delivering a base layer of the functional resin to the lower portion of the vessel via the lower opening of the resin transfer passage, and then filling the upper portion of the vessel by allowing the functional resin to pour onto the base layer via the intermediate opening of the resin transfer passage.

19. The method of claim 18, further comprising purifying water using the deionization apparatus to achieve a resistance of 18.2 million Ohms.

20. The method of claim 18, wherein the method is completed in an elapsed time of less than 20 minutes.

* * * * *